No. 728,126. PATENTED MAY 12, 1903.
P. W. McCAFFREY.
PRECIPITATING APPARATUS.
APPLICATION FILED AUG. 25, 1902.
NO MODEL.

WITNESSES:
INVENTOR.
Peter W. McCaffrey
BY
ATTORNEY.

No. 728,126. Patented May 12, 1903.

UNITED STATES PATENT OFFICE.

PETER W. McCAFFREY, OF DENVER, COLORADO, ASSIGNOR TO THE UNION ORE EXTRACTION AND REDUCTION COMPANY, OF DENVER, COLORADO.

PRECIPITATING APPARATUS.

SPECIFICATION forming part of Letters Patent No. 728,126, dated May 12, 1903.

Application filed August 25, 1902. Serial No. 121,004. (No model.)

*To all whom it may concern:*

Be it known that I, PETER W. MCCAFFREY, a citizen of the United States of America, residing at Denver, in the county of Arapahoe and State of Colorado, have invented certain new and useful Improvements in Precipitating Apparatus; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in precipitating apparatus or means for separating dissolved metallic values from the solution containing them.

The apparatus is especially intended for use in precipitating copper and will be described in this specification with special reference to its use for that purpose.

Briefly stated, the apparatus consists of a tank containing the solution from which the dissolved values are to be separated. On opposite sides of a wooden partition centrally mounted in the tank are located two perforated cylinders containing scrap metal and made to rotate in opposite directions, whereby the solution is set in motion and a continuous current produced in one direction, whereby the circulation of the solution through the scrap metal in the cylinders is greatly facilitated.

The invention will now be described in detail, reference being made to the accompanying drawings, in which is illustrated an embodiment thereof.

Figure 2:
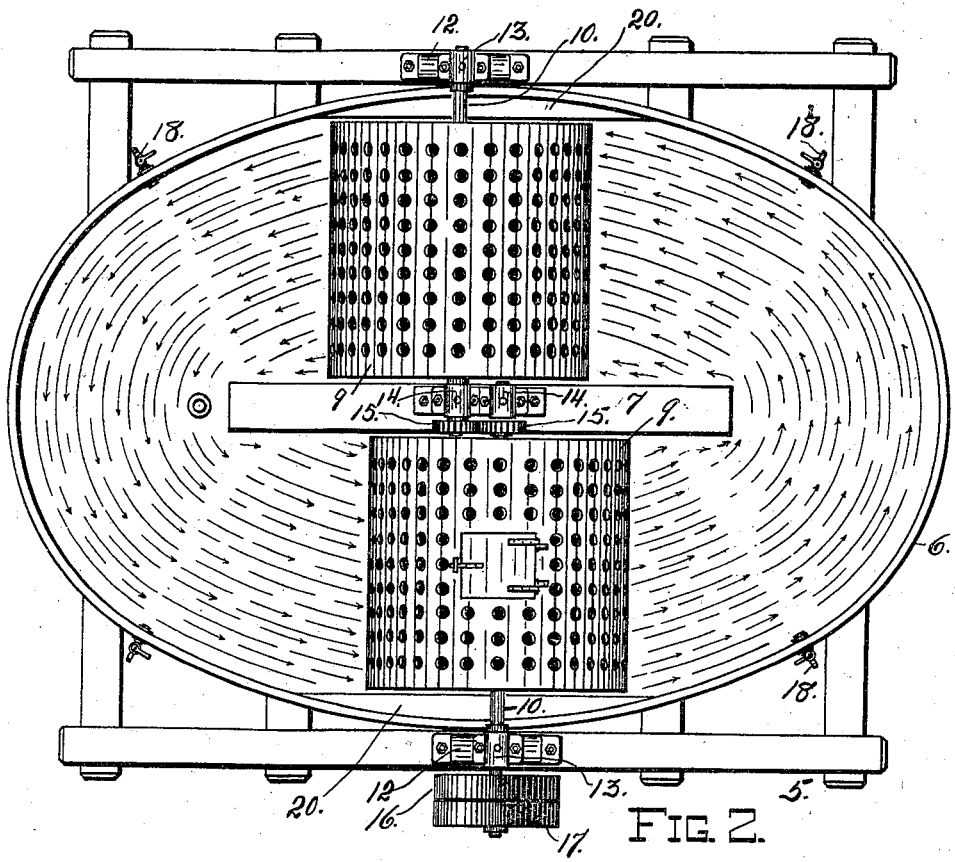
Figure 1:
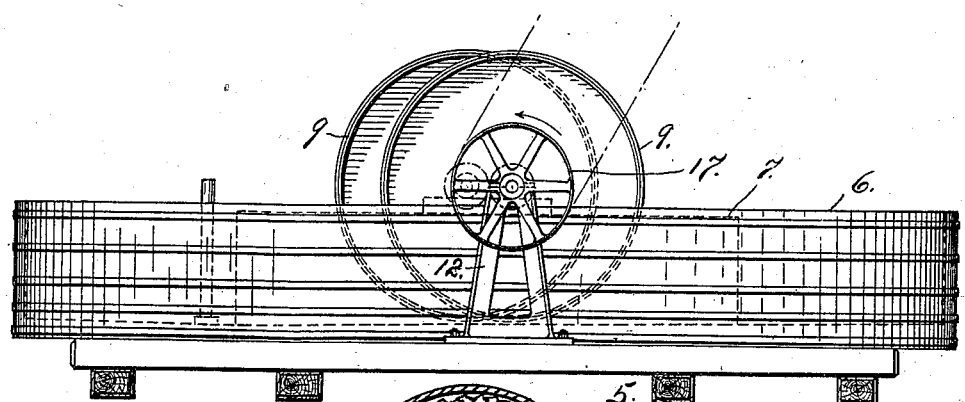
Figure 3:
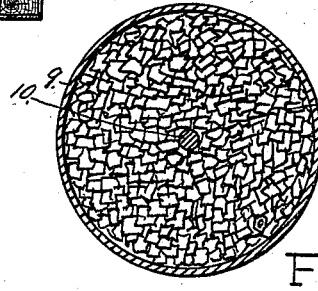

In the drawings, Figure 1 is a side elevation of my improved apparatus. Fig. 2 is a top or plan view of the same. Fig. 3 is a cross-section of one of the rotary cylinders, showing the scrap-iron within.

The same reference characters indicate the same parts in all the views.

Let the numeral 5 designate a suitable frame, upon which is mounted a suitable tank 6, adapted to contain the liquor from which the copper in solution is to be precipitated. This tank is preferably oval or elliptical in plan view to facilitate the circulation of the liquid therein. In the central portion of the tank, in line with the greater axis of the ellipse, is placed a partition 7. This partition does not extend the entire length of the tank or of its greater axis, but allows the liquid to circulate freely around its extremities, as shown in the drawings. On each side of the partition 7 is located a perforated copper cylinder 9, mounted on and made fast to a shaft 10. The frame 6 is provided with a standard 12 on each side. On these standards are mounted boxes 13, in which the outer extremities of the shafts 10 are journaled, while the inner extremities of these shafts are journaled in boxes 14, mounted on the partition 7. At their inner extremities the two shafts are connected by gears 15, whereby the rotation of one shaft and its cylinder will impart rotary motion to the other shaft and its cylinder in the opposite or reverse direction. For this purpose one of the shafts is provided with fast and loose pulleys 16 and 17. It is evident that the cylinders may be operated as described by connecting the fast pulleys 16 with a belt running from a line-shaft (not shown) or other suitable motor or source of power. The wall of the tank 6 is provided with valved inlets 18 for the introduction of live steam, which facilitates the chemical reaction necessary to effect the precipitation of the copper. At the outer end of each cylinder a wooden piece or block 20 is secured to the tank. The inner surface of each of these pieces is parallel with the end of the cylinder, only sufficient space being left to allow the cylinders to rotate freely. The extremities of the cylinders are as close to the partition 7 and the blocks 20 as is consistent with perfect freedom of movement or rotary action. This construction compels practically all of the liquor in the tank to circulate through the scrap-iron in the cylinders. The cylinders are filled with scrap-iron, (designated 25 in Fig. 3.)

When the apparatus is in use, the tank is filled with the solution containing the copper, preferably within a few inches of the top, whereby the lower portions of the cylinders are immersed therein to a considerable depth. The tanks are then set in motion in opposite directions, as heretofore explained, whereby the liquid is caused to circulate through the cylinders, as indicated by the arrows in Fig. 2. By reason of the chemical reaction between the solution and the iron and the cylinders ferrous sulfate ($FeSO_4$) is formed and the copper is precipitated.

This apparatus is especially adapted for use in connection with the Gardiner leaching process protected by United States Letters Patent No. 649,296, in which a suitable composition of matter is employed for placing in solution copper-oxid ore. The apparatus may, however, be employed to advantage in connection with any other copper-leaching process in which the precipitation of the copper is effected by the aid of iron.

The foregoing detail description has special reference to the precipitation of copper through the agency of scrap-iron in the perforated copper cylinders. In the precipitation of other metals other scrap metal may be required in the cylinders, and the scope of the invention is sufficiently broad to cover scrap metal generically in the cylinders.

The term "scrap metal" as used in this specification is intended to cover metal which is sufficiently finely divided to expose to the action of the liquid a considerable area of surface and which at the same time will be sufficiently loose in the cylinders to permit the liquid to circulate freely therethrough.

Having thus described my invention, what I claim is—

1. In precipitating apparatus, the combination of a tank for holding the solution, said tank being provided with a central partition, around the extremities of which the liquid is free to circulate, cylinders mounted to rotate on opposite sides of the said partition and partially immersed in the solution, said cylinders being perforated and containing scrap metal, and means for rotating the cylinders in reverse directions whereby the liquid is set in motion in a circular current, substantially as described.

2. In precipitating apparatus, the combination of a tank having curved walls, two perforated copper cylinders mounted end to end on opposite sides of the tank, said cylinders containing scrap-iron, and means for simultaneously rotating the cylinders in reverse directions whereby the solution is set in motion in a circular current, substantially as described.

3. In precipitating apparatus, the combination of a tank having curved walls, said tank being adapted to hold the solution to be treated and being provided with a central partition around the extremities of which the liquid is free to circulate, blocks or pieces made fast to the opposite sides of the tank, their inner surfaces being parallel with the surfaces of the partition, and cylinders mounted to rotate on opposite sides of the partition and partially immersed in the solution, said cylinders being perforated and containing scrap-iron, the ends of the cylinders being located as close to the partition and the said blocks, as is practicable in order to allow perfect freedom of movement, and means for rotating the cylinders in reverse directions whereby the liquid is set in motion in a circular current, substantially as described.

In testimony whereof I affix my signature in presence of two witnesses.

PETER W. McCAFFREY.

Witnesses:
DENA NELSON,
A. J. O'BRIEN.